United States Patent [19]

Pringle

[11] 4,370,918
[45] Feb. 1, 1983

[54] FLUID CYLINDER ASSEMBLY

[76] Inventor: William L. Pringle, 999 Lake Shore Rd., Grosse Pointe Shores, Mich. 48236

[21] Appl. No.: 132,716

[22] Filed: Mar. 24, 1980

[51] Int. Cl.³ .............................................. F16J 9/00
[52] U.S. Cl. ..................................... 92/163; 92/253; 92/260
[58] Field of Search ............... 92/260, 231, 248, 249, 92/250, 251, 252, 13.6, 98 R, 163, 253

[56] References Cited

U.S. PATENT DOCUMENTS

| | | | |
|---|---|---|---|
| 1,572,822 | 2/1926 | Stephenson | 92/13.6 |
| 1,795,949 | 3/1931 | Hughes | 92/231 |
| 2,387,344 | 10/1945 | Paton | 92/231 |
| 3,187,645 | 6/1965 | Cope | 92/251 |
| 3,200,717 | 8/1965 | Einsiedler | 92/163 |
| 3,385,173 | 5/1968 | Euga | 92/62 |
| 3,965,223 | 6/1976 | Benjamin et al. | 92/13.6 |

Primary Examiner—Paul E. Maslousky
Attorney, Agent, or Firm—McGlynn and Milton

[57] ABSTRACT

A fluid cylinder assembly comprising a cylinder housing including a closed end portion and a piston assembly including an end piece member having at least one projection extending therefrom for abutting the closed end portion of the cylinder housing so as to prevent the piston assembly from completely engaging the closed end portion, a washer member having a projection extending therefrom and a cup member. The washer includes bulges on both sides thereof circumferentially spaced from the projection such that the bulges are disposed against the surfaces of the end piece member and cup member when the projection of the washer is inserted within the projection of the end piece member so as to allow fusing of the bulges with the end piece member and the cup member.

13 Claims, 4 Drawing Figures

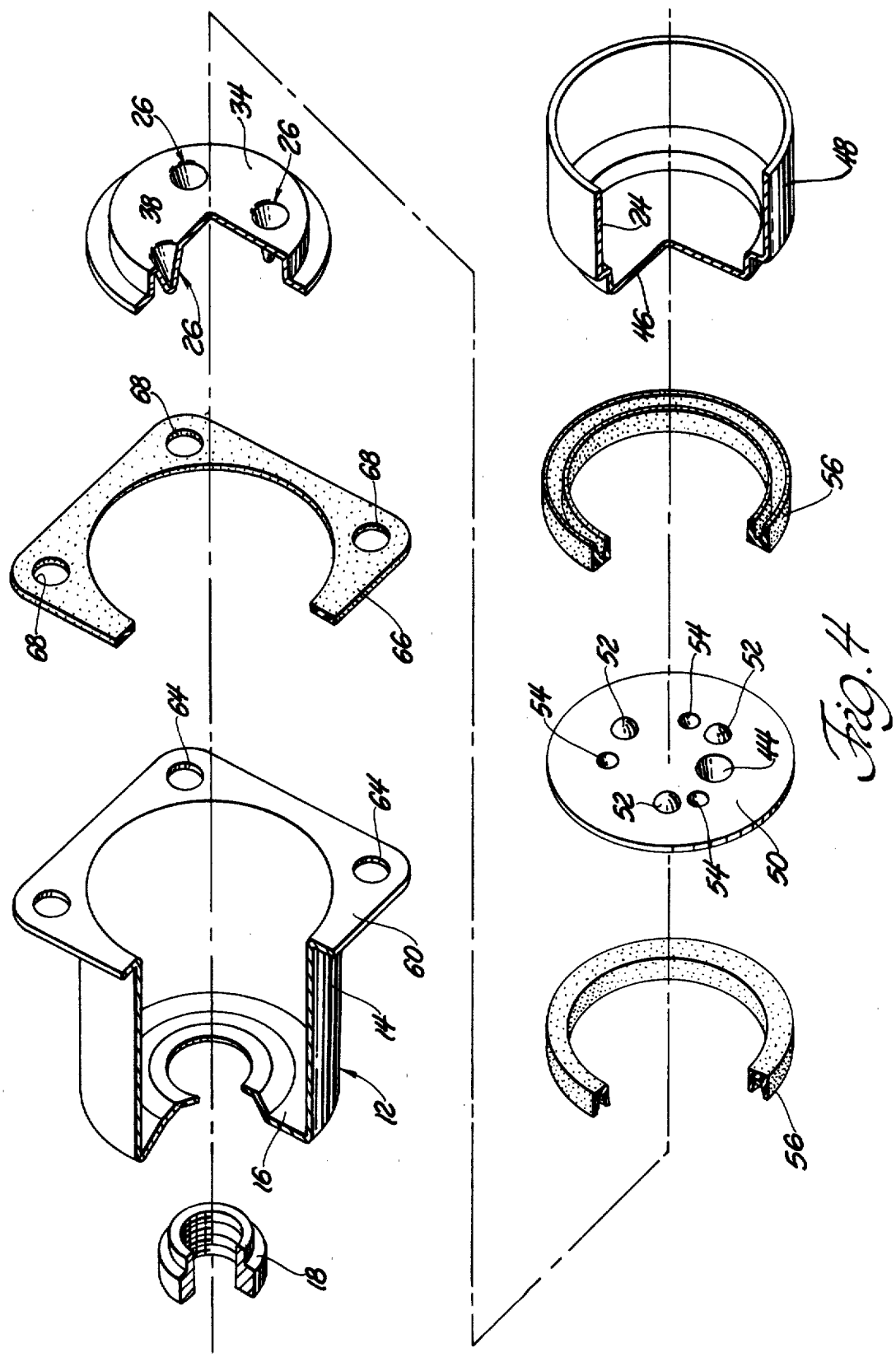

FLUID CYLINDER ASSEMBLY

BACKGROUND OF THE INVENTION (1) Field of the Invention

The subject invention relates to a fluid cylinder assembly such as the type used to shift a differential in a tandem axle truck or actuate a brake assembly.

(2) Description of the Prior Art

Prior art fluid cylinder assemblies have been made either from entirely cast parts or from a combination of cast parts and stamped parts. Problems arise from these prior art constructions. First, any inclusion of cast parts to an assembly cause increased weight in the assembly as compared to the inclusion of stamped parts. Second, specific problems arise with the use of certain stamped parts in a fluid cylinder assembly. Also, prior art assemblies including multipart pistons have been complicated in construction.

SUMMARY OF THE INVENTION

The instant invention provides a fluid cylinder assembly comprising a cylinder housing including a cylindrical wall portion and a closed end portion having fluid inlet means for receiving a supply of fluid therethrough. The subject assembly also comprises a piston assembly including a pressure wall facing the closed end portion and side walls for sliding engagement within the cylindrical wall portion of the cylinder housing. The pressure wall includes a projection extending therefrom for abutting the closed end portion of the cylinder housing so as to prevent the piston assembly from completely engaging the closed end portion.

PRIOR ART STATEMENT

An example of a fluid-actuated cylinder assembly having a multipart piston assembly is the U.S. Pat. No. 3,385,173 to Euga. Several of the embodiments disclosed in the Euga patent include a stamped cylinder housing. However, no structure is shown which includes a housing and piston assembly constructed entirely from stamped parts. Also, the Euga patent discloses a complicated multipart construction wherein the piston assembly requires components to be bolted without the convenience of alignment guides. Therefore, the prior art construction is heavy in weight and difficult to assemble. The result is a more expensive assembly to construct and to maintain in a vehicle.

BRIEF DESCRIPTION OF THE DRAWING

Other advantages of the present invention will be readily appreciated as the same becomes better understood by reference to the following detailed description when considered in connection with the accompanying drawings wherein:

FIG. 4 is an exploded perspective view of the instant invention.

DESCRIPTION OF PREFERRED EMBODIMENT

Figure 1:
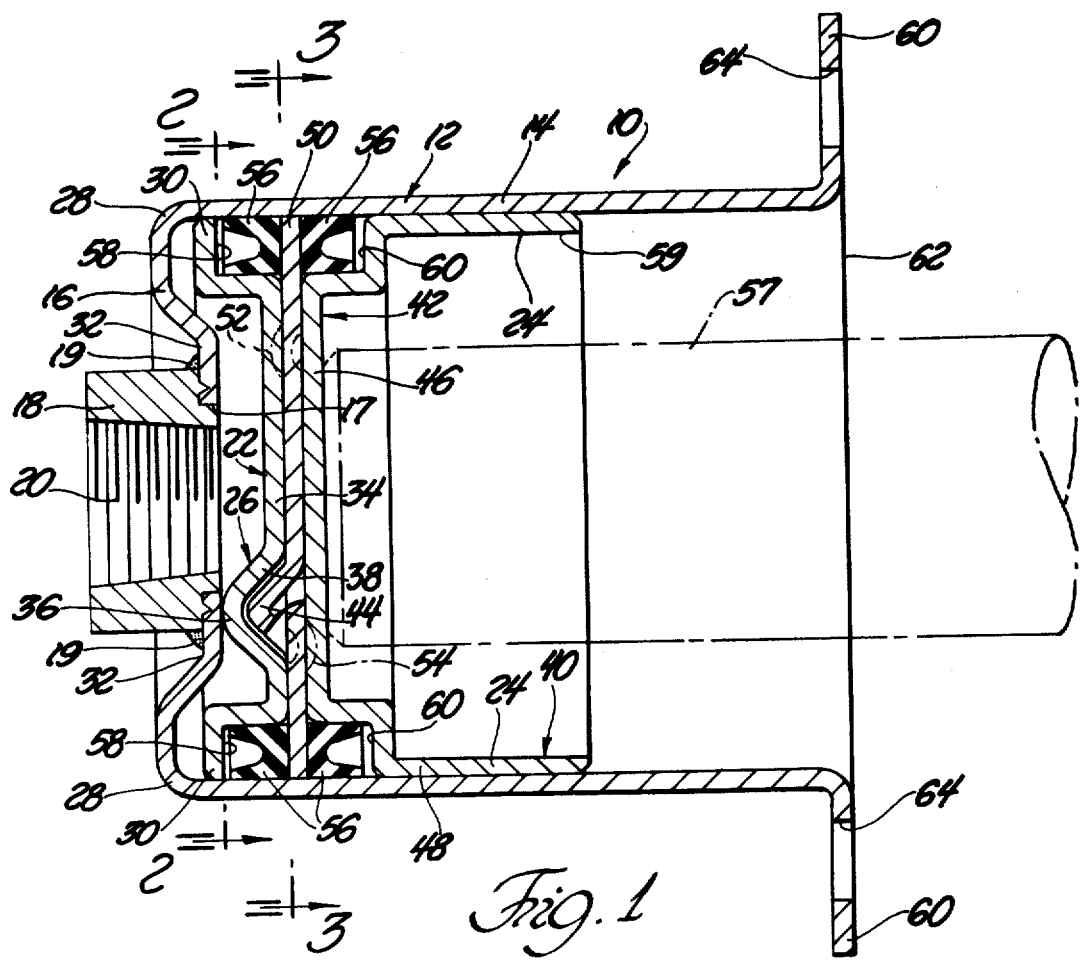
FIG. 1 is a partially broken-away cross-sectional view of the instant invention.

A fluid cylinder assembly constructed in accordance with the instant invention is generally shown at 10 in FIG. 1.

The fluid cylinder assembly 10 includes a cylinder housing generally indicated at 12. The cylinder housing includes a cylindrical wall portion 14 and a closed end portion 16. The end portion 16 includes an opening 17 for receiving a fluid inlet adaptor or fitting 18. The fluid inlet fitting 18 is secured to opening 17 by conventional means such as welds 19. The inlet fitting 18 includes threads 20 for threadedly receiving means for supplying fluid therethrough, such as a threaded tube.

The fluid cylinder assembly 10 also includes a piston assembly having pressure wall means generally indicated at 22 facing the closed end portion 16 and side walls 24 for sliding engagement within the cylindrical wall portion 14 of the cylinder housing 12. The pressure wall means 22 includes projection means generally indicated at 26 extending therefrom for abutting the closed end portion 16 of the cylinder housing 12 so as to prevent the piston assembly from completely engaging the closed end portion 16.

The cylindrical wall portion 14 and the end portion 16 of the cylinder housing 12 are integrally joined by a circular portion 28 which is rounded. The projection means 26 prevents the periphery 30 of the pressure wall 22 from engaging the rounded circular portion 28. In other words, the travel of the piston is limited by the engagement of the projection means 26 with the end wall 16 thereby preventing the periphery 30 of the pressure wall 22 from "bottoming out" with the closed end portion 16 of the cylinder housing 12. Therefore, the instant invention is constructed so that the circular extremity 30 of the pressure wall 22 is in close engagement with the cylindrical wall portion 14 of the cylinder housing 12.

The end portion 16 of the cylinder housing 12 includes a centrally disposed dished portion 32 extending into the cylinder housing 12 such that the projection means 26 is engageable with the dished portion 32. Therefore, the dished portion 32 engages the projection means 26 so as to prevent the rounded portions 28 from being contacted by the periphery 30 of the pressure wall 22. If the instant invention is constructed without the dished portion 32, the projection means 26 would necessarily have to extend further from the surface of the pressure wall 22 so as to prevent contact and "bottoming out" of the periphery 30 of the pressure wall 22. Therefore, the dished portion 32 provides a means for limiting the necessary extension of the projection means 26.

Figure 2:
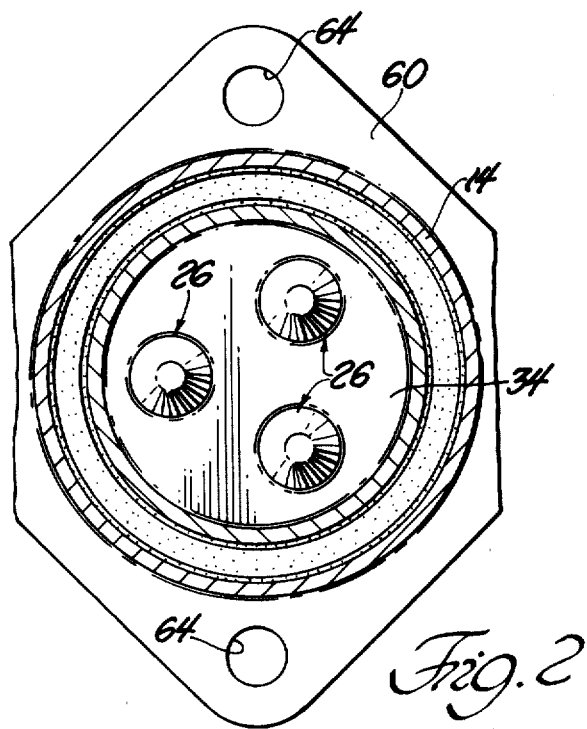
FIG. 2 is a cross-sectional plan view taken substantially along line 2—2 of FIG. 1.

The piston assembly includes an end piece member 34 defining the pressure wall 22. The projection means 26 includes at least one integral male portion 36 extending from one surface of the end piece member 34. On the opposite surface of the end piece member 34, the projection means 26 defines a female portion 38. As shown in FIG. 2, the preferred embodiment of the end piece member 34 includes three projection means 26. This preferred number of projections is not essential to the proper functioning of the instant invention; however, three such projection means 26 is regarded as minimal.

The piston assembly also includes cup means generally indicated at 40 defining the side walls 24 and bottom wall means generally indicated at 42. The bottom wall means 42 includes a second projection means 44 extending therefrom for engaging the female portion 38 of the projection means 26. The bottom wall means 42 includes a bottom 46 integral with the side walls 24 of the cup means 40 to define a cup member 48. The bottom wall means 42 also includes a washer member 50 disposed between the bottom 46 of the cup member 48 and the end piece member 34. The washer member 50 includes the second projection means 44 which extends therefrom.

Figure 3:
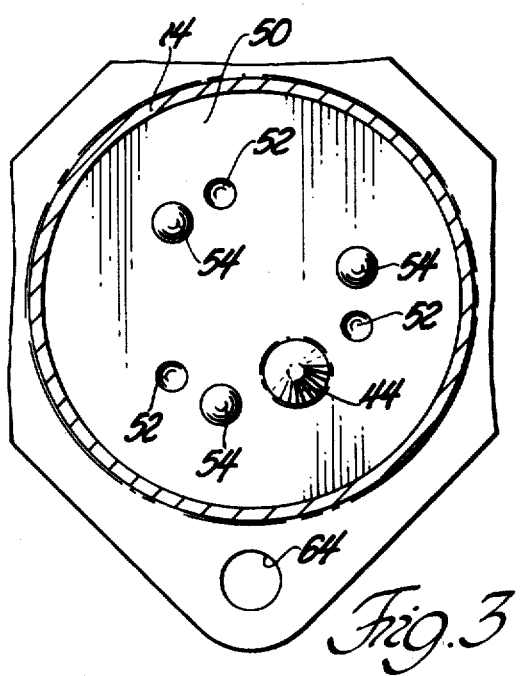
FIG. 3 is a cross-sectional plan view taken substantially along line 3—3 of FIG. 1.

The washer member includes integral bulges 52 and 54 on each side thereof for fusing together the end piece member 34 and the bottom 46 of the cup member 48. The bulges 52 and 54 extend from each side of the washer member 50 as shown in FIG. 3. The bulges 52 and 54 are circumferentially spaced from the second projection means 44 so as to dispose all of the bulges 52 on one surface of the washer member 50 against the surface of the end piece member 34 when the second projection means 44 of the washer member 50 engages the female portion 38 of the projection means 26. In other words, it is desirable in aligning the washer member 50 with the end piece member 34 that the bulges 52 facing the end piece member 34 do not fall within any of the female portions of the projection means 26. As shown in FIG. 2, the preferred embodiment of the subject invention includes three projection means 26. If one of the bulges 52 were to fall within the female portion 38 of any of the projection means 26, spot-welding to fuse the bulge 52 to the end piece member 34 would not be accomplished. Therefore, the bulges 52 are circumferentially spaced from the second projection means 44 on the washer member 50 so that when the second projection means 44 is aligned within the female portion 38 of the end piece member 34, the bulges 52 do not fall within any of the other female portions 38 of the other projection means 26 of the end piece member. Therefore, alignment is accomplished and efficient welds can be made. Also, because of the consistency of the spacing of the bulges 52 and 54 from the second projection means 44, construction can be efficiently accomplished since the welder will know exactly where the bulges are located.

Referring to FIG. 1, the piston assembly includes sealing members 56 disposed about the end piece member 34 and the cup member 48 for perfecting a seal between the piston assembly and the cylindrical wall portion 14 of the cylinder housing 12. Therefore, as the piston rod 57 is driven by fluid actuation through the air inlet fitting 18 or as the piston rod 57 drives the piston assembly towards the closed end portion 16 of the cylinder housing, an air-tight seal is perfected on each side of the washer member 50. In the preferred embodiment the end piece member 34 and the cup member 48 each define an annular pocket 58 and 60, respectively, about the exterior thereof. The pocket 58 is juxtaposed with the pocket 60 such that the outer periphery of the washer member 50 is disposed between the pockets. The sealing members 56 are disposed within each of the pockets 58 and 60.

As shown in cross section in FIG. 1, the sealing members 56 have a generally U-shaped cross section with the closed end or bottom of the U engaging the periphery of the washer member 50. Therefore, as fluid pressure builds up against the pressure wall 22, the fluid pressure expands the legs of the U-shaped sealing member 56 disposed within the pockets 58 of the end piece member 34 whereby the legs engage the pocket 58 and cylindrical wall 14 of the cylinder housing to perfect a more efficient seal therebetween.

In the preferred embodiment, the end piece member 34, the washer member 50, the cup member 48 and the cylinder housing 12 are all stamped from sheet metal. Therefore, the instant invention is much lighter in weight than prior art fluid cylinder assemblies made from cast metal parts.

The cylinder housing includes a radially outwardly extending flange 60 about the open end 62. The flange 60 includes bolt holes 64 therein for receiving bolting means for engaging the cylinder to a vehicle assembly.

FIG. 4 illustrates the novel method of constructing the instant invention. The instant invention including the cylinder housing 12 having a closed end portion 16, an end piece member 34 having at least one projection 26 on one surface thereof defining a female portion 38 on the other surface, a washer member 50 having a projection 44 extending therefrom, and a cup member 48 having a bottom 46, is constructed by the method comprising the steps of assembling the components together and including the insertion of the projections 44 extending from the washer 50 into the female portion 38 defined by the projection 26 extending from the end piece member 34. Therefore, the bulges 52 are aligned so as to engage the flat surface of the end piece member 34 and the washer member 50 is aligned in between the end piece member 34 and cup member 48 so that resistance welding the end piece member and washer and cup member together fuses the integral bulges 52 and 54 of the washer member 50 into the end piece member 34 and the cup member 48.

Referring to FIG. 4, gasket 66 is disposed between flange portion 60 and the receiving attachment site on the vehicle assembly so as to perfect a seal therebetween. The gasket 66 includes openings 68 which are aligned with openings 64 in the flange portion 60 during assembly.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A fluid cylinder assembly (10) comprising; a cylinder housing (12) including a cylindrical wall portion (14) and a closed end portion (16) having fluid inlet means (18) for receiving a supply of fluid therethrough, a piston assembly including a pressure wall (22) facing said closed end portion (16) and side walls (24) for sliding engagement within said cylindrical wall portion (14) of said cylinder housing (12), characterized by said pressure wall (22) including first projection means (26) extending from said pressure wall (22) for abutting said closed end portion (16) of said cylinder housing (12) so as to prevent said piston assembly from completely engaging said closed end portion (16), said piston assembly including an end piece member (34) defining said pressure wall (22), said first projection means (26) including at least one integral male portion (36) extending from one surface of said end piece member (34) and defining a female portion (38) on the opposite surface of said end piece member (34), and cup means (40) defining said side walls (24) and including bottom wall means (42), said bottom wall means (42) including second projection means (44) extending from said bottom wall means (42) for engaging said female portion (38) of said projection means (26) of said end piece member (34).

2. An assembly as set forth in claim 1 wherein said cylindrical wall portion (14) and said end portion (16) of said cylinder housing (12) are integral and are joined by a circular portion (28) which is rounded, said first projection means (26) preventing the periphery (30) of said pressure wall (22) from engaging said rounded circular portion (28).

3. An assembly as set forth in claim 2 wherein said end portion (16) of said cylinder housing (12) includes a centrally disposed dished portion (32) extending into said cylinder housing (12), said first projection means (26) being engageable with said dished portion (32).

4. An assembly as set forth in claim 1 wherein said bottom wall means (42) includes a bottom (46) integral with said side walls (24) of said cup means (40) to define a cup member (48) and a washer member (50) disposed between said bottom (46) and said end piece member (34), said washer member (50) including said second projection means (44) extending therefrom.

5. An assembly as set forth in claim 4 wherein said washer member (50) includes fusing means (52, 54) on each side thereof for fusing together said end piece member (34) and said bottom (46) of said cup member (48).

6. An assembly as set forth in claim 5 wherein said fusing means (52, 54) includes integral bulges (52, 54) extending from each side of said washer member (50), said bulges being circumferentially spaced from said second projection means (44) so as to dispose all of said bulges (52) on one surface of said washer member (50) against the surface of said end piece member (34) when said second projection means (44) of said washer member (50) engages said female portion (38) of said projection means (26).

7. An assembly as set forth in claim 6 wherein said piston assembly includes sealing means (56) disposed about said end piece member (34) and said cup member (48) for perfecting a seal between said piston assembly and said cylindrical wall portion (14) of said cylinder housing (12).

8. An assembly as set forth in claim 7 wherein said end piece member (34) and said cup member (48) each define an annular pocket (58, 60) about the exterior thereof, said pockets (58, 60) being juxtaposed with the outer periphery of said washer member (50) being disposed between said pockets (58, 60), said sealing means (56) comprising a sealing member (56) in each of said pockets (58, 60).

9. An assembly as set forth in claim 8 wherein each sealing member (56) has a generally U-shaped cross section with the base of the U-shape engaging said periphery of said washer member (50).

10. An assembly as set forth in claim 9 wherein said end piece member (34), said washer member (50), said cup member (48) and said cylinder housing (12) are all made from sheet metal.

11. An assembly as set forth in claim 10 wherein said cylinder housing (12) includes a radial flange (60) about the open end (60) thereof.

12. An assembly as set forth in claim 9 wherein said cylindrical wall portion (14) and said end portion (16) of said cylinder housing (12) are integral and are joined together by a circular portion (22) which is rounded, said end portion (16) of said cylinder housing (12) includes a centrally disposed dished portion (32) extending into said cylinder housing (12), said projection means being engageable with said dished portion (32) to prevent the periphery of said end piece member (34) from engaging said rounded circular portion (28).

13. A method of assembling a fluid cylinder assembly including a cylinder housing (12) having a closed end portion (16), an end piece member (34) having at least one male projection (26) on one surface thereof defining a female portion (38) on the other surface, a washer member (50) having a projection (44) extending therefrom and an integral bulge on each side thereof which are circumferentially spaced from the projection (44) and a cup member (48) having a bottom (46), said method comprising the steps of; inserting the projection (44) extending from the washer member (50) into the female portion (38) of the end piece member (34) while disposing the bulge (52) on one side of the washer member (50) against the surface of the end piece member (34) as the projection (44) engages the female portion (38) of the end piece member (34) and the other bulge (54) on the other side of the washer (50) against the surface of the cup member (48), and welding the end piece member (34) and washer member (50) and cup member (48) together so as to fuse one (52) of the integral bulges (52)(54) of the washer member (50) into the end piece member (34) and the other one (54) of the integral bulges (52)(54) into the cup member (48).

* * * * *